(12) United States Patent (10) Patent No.: US 9,009,618 B2
Schone et al. (45) Date of Patent: Apr. 14, 2015

(54) THREE-DIMENSIONAL VISUALIZATION OF STATUS AND PROGRESS OF A PROCESS

(75) Inventors: Gregory L. Schone, Milford, MI (US); Timothy J. Herrick, Rochester Hills, MI (US); Nathan A. Wilmot, Walled Lake, MI (US); Dennis J. Pastor, Marietta, GA (US); Jamie L. Pickett, Macomb, MI (US); Kevin T. Quinn, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 821 days.

(21) Appl. No.: 13/156,068

(22) Filed: Jun. 8, 2011

(65) Prior Publication Data

US 2012/0317508 A1 Dec. 13, 2012

(51) Int. Cl.
*G06F 3/0481* (2013.01)
*G06T 15/00* (2011.01)
*G06F 17/30* (2006.01)
*G06F 3/00* (2006.01)
*G06Q 10/06* (2012.01)

(52) U.S. Cl.
CPC ...... *G06F 17/30* (2013.01); *G06F 3/00* (2013.01); *G06Q 10/0631* (2013.01)

(58) Field of Classification Search
CPC ........ G06F 3/048; G06T 11/206; G06T 15/00
USPC ........................................................ 715/772
See application file for complete search history.

(56) References Cited

U.S. PATENT DOCUMENTS

| | | | | |
|---|---|---|---|---|
| 5,671,381 A | * | 9/1997 | Strasnick et al. | 715/848 |
| 6,222,557 B1 | * | 4/2001 | Pulley et al. | 345/622 |
| 6,253,218 B1 | * | 6/2001 | Aoki et al. | 715/201 |
| 6,281,898 B1 | * | 8/2001 | Nikolovska et al. | 715/848 |
| 7,079,142 B2 | * | 7/2006 | Chiu et al. | 345/440 |
| 7,639,256 B1 | * | 12/2009 | Yablonski et al. | 345/440 |
| 7,680,817 B2 | * | 3/2010 | Audet et al. | 707/999.102 |
| 2004/0032427 A1 | * | 2/2004 | Kekki et al. | 345/764 |
| 2004/0221307 A1 | * | 11/2004 | Arai et al. | 725/44 |
| 2009/0235267 A1 | * | 9/2009 | McKinney et al. | 718/104 |
| 2012/0004026 A1 | * | 1/2012 | Vann | 463/25 |

OTHER PUBLICATIONS

Microsoft Project 2010 Step by Step, Chatfield et al., Jun. 21, 2010, pp. 129, 132, 134, 242, 244, 260 and 283.*

(Continued)

*Primary Examiner* — Matthew Ell
(74) *Attorney, Agent, or Firm* — Ingrassia Fisher & Lorenz, P.C.

(57) ABSTRACT

A method of tracking status and progress of a process is presented and described herein. The method provides a plurality of markers that can be visualized in three dimensions, where each of the plurality of markers represents a respective trackable event. The markers are arranged in a three-dimensional configuration that visually indicates current status of a plurality of trackable events corresponding to the plurality of markers, and the three-dimensional configuration is updated over time to visually indicate an updated status of the plurality of trackable events. The markers and the three-dimensional configuration may be realized using a tangible model or a virtual model that is generated and rendered on a display element.

11 Claims, 9 Drawing Sheets

(56) References Cited

OTHER PUBLICATIONS

Project Connections Blog: Lego My Schedule [online]. Geof Lory. Dec. 2009. [Retrieved on Jun. 7, 2011]. Retrieved from Internet: <URL: http://blog.projectconnections.com/geof_lory/2009/12/lego-my-schedule.html>.

Lean Lego Exercise: Visual Controls and 5S [online]. Velaction Continuous Improvement, LLC, 2009-2010 [Retrieved on Jun. 7, 2011]. Retrieved from Internet: <URL:http://www.velaction.com/lean-lego-exercise-visual-controls-and-5S/>.

Lego Serious Play—Build Your Way to Better Business [online]. [Retrieved on Jun. 7, 2011]. Retrieved from Internet: <URL:http://www.seriousplay.com/>.

Tangible Time Tracking With Legos—The Evolving Ultrasaurus [online]. Sarah Allen. Sep. 1, 2008. [Retrieved on Jun. 7, 2011]. Retrieved from Internet: <URL:http://www.ultrasaurus.com/sarahblog/2008/09/tangible-time-tracking-with-legos/>.

InfoQ: Lego Is Not Just for Kids Anymore [online]. Vikas Hazrati. Sep. 12, 2008. [Retrieved on Jun. 7, 2011]. Retrieved from Internet: <URL:http://www.infoq.com/news/2008/09/lego-information-radiators>.

Lego Blocks as Time Trackers? [online]. Dan Taylor. TSheets.com, 2006-2011. [Retrieved on Jun. 7, 2011]. Retrieved from Internet: <URL: http://blog.tsheets.com/2008/business-help/lego-blocks-as-time-trackers.html>.

* cited by examiner

THREE-DIMENSIONAL VISUALIZATION OF STATUS AND PROGRESS OF A PROCESS

TECHNICAL FIELD

Embodiments of the subject matter described herein relate generally to the tracking and monitoring of processes such as manufacturing processes. More particularly, embodiments of the subject matter relate to a tool that provides a three-dimensional visual representation of the status and progress of a process.

BACKGROUND

Workflow, manufacturing, customer service, and other processes may need to be monitored, tracked, and supervised to ensure that they are completed on time and in an efficient and effective manner. For example, a healthcare facility (such as a clinic, an emergency room, or a doctor's office) may track the status and progression of patients from check-in until discharge to ensure that all patients are cared for on a timely basis and to increase patient throughput. As another example, a manufacturing entity (such as an automobile manufacturing plant or design department) may track the status and progress of design and/or manufacturing issues, tasks, or projects as needed.

The status and progress of a given process can be monitored, updated, and viewed using one or more computer-implemented applications. In this regard, databases, spreadsheets, and other software applications can be used to generate reports, charts, graphs, and other representations of status and progress data for a monitored process. These applications and tools, however, typically rely on user interpretation and manipulation of data, e.g., reading a spreadsheet, accessing status data for a tracked person, event, or product, or the like. Moreover, existing applications and tools may not provide a quick and easy to interpret visualization of the current status of a plurality of monitored or tracked events, persons, entities, products, etc.

BRIEF SUMMARY

An exemplary embodiment of a method of tracking status and progress of a process is provided. The method provides a plurality of markers that can be visualized in three dimensions, each of the plurality of markers representing a respective trackable event. The method continues by arranging the plurality of markers in a three-dimensional configuration that visually indicates current status of a plurality of trackable events corresponding to the plurality of markers. The method updates the three-dimensional configuration over time to visually indicate an updated status of the plurality of trackable events.

Also provided is an exemplary embodiment of a computer-implemented method of tracking a process having quantity, temporal, and progress status characteristics. The method renders, on a display element, a plurality of markers in a three-dimensional configuration that visually indicates the quantity, temporal, and progress status characteristics of a plurality of trackable events. Each of the plurality of markers represents a respective one of the plurality of trackable events. The method continues by obtaining information indicative of an updated status of the plurality of trackable events and, in response to obtaining the information, updating the three-dimensional configuration to visually indicate the updated status of the plurality of trackable events.

Another exemplary embodiment of a method of tracking status and progress of a process is provided. The method provides a plurality of markers that can be visualized in three dimensions, each of the plurality of markers representing a respective trackable event. The method continues by providing a visually perceivable environment having at least a category axis associated with a plurality of different event categories, a temporal axis, and a quantity axis defined therein. The method arranges the plurality of markers in the visually perceivable environment using a three-dimensional configuration that visually indicates current status of a plurality of trackable events corresponding to the plurality of markers. The plurality of markers are arranged along the category axis in accordance with their respective event categories, arranged along the temporal axis in accordance with age of their respective trackable events, and arranged along the quantity axis in accordance with a number of trackable events that begin during a period of time identified on the temporal axis.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The subject matter presented here relates to a visual management tool that can be utilized to visually monitor and track the status and progress of one or more processes, operations, methods, object flow, or the like. The visual management tool may be realized using a physical and tangible model or as a computer-implemented application (e.g., a software-driven system) that generates appropriate graphical displays. The visual characteristics and other aspects, however, are common to both implementations. In this regard, the physical model and the computer-implemented system are both used to provide users with a visual indication of the current status and progress of a process, where the visual indication is easy to understand and quick to interpret.

The subject matter described here can be utilized in connection with the tracking and monitoring of any number of processes and operations, across a variety of industries, and for any number of different contextual applications. For example, the techniques and technologies presented here could be used to track the status and progress of processes such as, without limitation: manufacturing processes; troubleshooting, repair, or revision tasks; throughput of patients in a healthcare environment; throughput of customers in a retail or service environment; construction projects; remodeling projects; academic progression of students; and the like. The techniques and technologies presented here may also be used to monitor and track the throughput and inventory of items such as parts, goods, foods, etc. Although not always required, the visual tracking approach described below is suitable for use with any process having volume (or quantity) characteristics, aging characteristics, and trackable status, states, or stages. The exemplary embodiment described here relates to the visual tracking of issues, problems, or tasks associated with the manufacturing, repair, support, or design of vehicles such as automobiles. It should be appreciated that the concepts described in connection with the exemplary embodiment can be extended to other applications, industries, and contexts.

Figure 1:
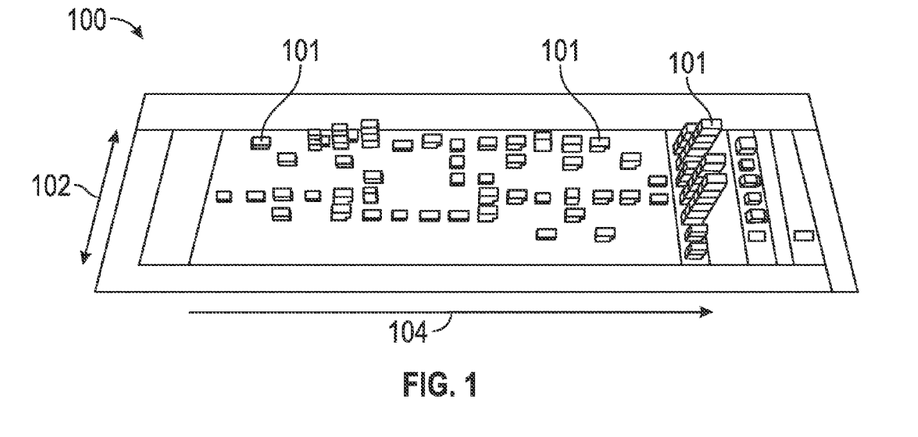
FIG. 1 is a perspective view of a physical model of a system for tracking status and progress of a process, according to one exemplary embodiment.

FIG. 1 is a perspective view of a physical model of a system 100 for tracking status and progress of a process. As mentioned above, although the system 100 represents a tangible model, an equivalent implementation could be deployed in a virtual manner using a suitably configured computer system and display element. The system 100 uses a three-dimensional environment, space, zone, or field that is visually perceivable by one or more users. The system 100 employs a plurality of event markers 101 that can be visualized in three dimensions. Each event marker 101 represents a visually trackable event. As used here, an "event" may be, without limitation: a product; an item; a person; an animal; a task; a team; a project; a trouble ticket; an issue in need of some resolution; a problem; a condition; or anything that is subject to status tracking, status updating, a progression, or the like.

This particular system 100 can be conceptualized as a board or layout having a category axis 102 associated with a plurality of different event categories, and having a temporal axis 104. In practice, the tracked events may be categorized, classified, labeled, or otherwise grouped in accordance with some scheme or definition. Thus, the category axis 102 can be used to categorize the markers 101 in rows as needed. The temporal axis 104 may be used to indicate the ages of the tracked events, where the markers 101 are positioned in accordance with how long the events have been tracked. For this example, relatively new events are indicated with markers 101 that appear closer to the left side of FIG. 1, and relatively old events are indicated with markers 101 that appear closer to the right side of FIG. 1.

The illustrated embodiment of the system 100 has three-dimensional characteristics in that it includes a quantity axis (which is orthogonal to both the category axis 102 and the temporal axis 104). The quantity axis is used to show the number of trackable events corresponding to a specified period of time, a specified time slot, or the like. As shown in FIG. 1, the markers 101 can be shown in a stacked arrangement, where higher stacks correspond to a higher number of tracked events. In this regard, any number of markers 101 may appear at any intersection of a category and a time period.

As time progresses, the positions of the markers 101 are moved to reflect aging of the events and/or to reflect the current status of the events (e.g., the extent to which each event has been completed, closed, or resolved). Accordingly, as time passes, the markers 101 for events that remain active or open will move along the temporal axis. Moreover, the markers 101 for events that are no longer active (i.e., they are closed) can be removed from the main section of the board.

As described in more detail below, each marker 101 may include indicia that represents a progress identifier for the corresponding event. The progress identifier indicates the current progress status for the trackable event assigned to the marker 101. In practice, the progress identifier can be updated over time to visually indicate the current progress status of the event (updating of the progress identifier need not be correlated to movement of the marker 101 along the temporal axis 104). The visual nature of the progress identifier represents another visual indicator that allows users to quickly obtain a general understanding of the status and progress of the tracked events. In addition, the actual or displayed size of the markers 101 may vary in accordance with certain criteria associated with the corresponding events. For example, different sizes can be used to indicate a level of importance assigned to the markers 101. Furthermore, the markers 101 can be colored as desired to visually convey additional information. For this embodiment, the markers 101 are colored in accordance with their event categories.

The system 100 is intuitive in that a user can quickly glance at the topography and layout of the markers 101 to determine an overall state of the various events being tracked, the volume of events for each category, the age of the tracked events, and the like. The three-dimensional characteristics of the system 100 enhance the visual recognition and comprehension of the event status represented by the number, height, and size of the markers 101.

Figure 2:
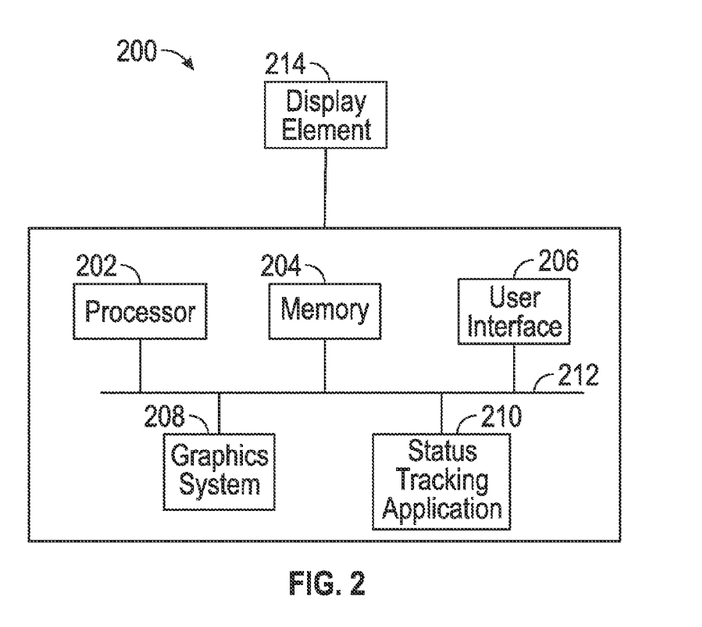
FIG. 2 is a schematic representation of a computer-implemented system for tracking status and progress of a process, according to one exemplary embodiment.

The visual characteristics and features associated with the system 100 (and associated with the exemplary embodiments described below) can be equivalently deployed in a virtual manner using a suitably configured computer system or computing device that cooperates with one or more display elements. In this regard, FIG. 2 is a schematic representation of a computer-implemented system 200 for tracking status and progress of a process, according to one exemplary embodiment. Depending upon the particular embodiment, the system 200 could be realized using any of the following platforms, without limitation: a desktop, laptop, tablet, netbook, or other computer; a mobile device such as a smartphone; a digital media player device; a video game system or device; a specialized piece of equipment designed for use in a manufacturing or testing environment; a computer module or electronic module onboard a vehicle; or the like.

The illustrated embodiment of the system 200 includes, without limitation: at least one processor 202; an appropriate amount of memory 204; a user interface 206; a graphics system 208; and a status tracking application 210 (or module). These elements of the system 200 may be coupled together by a suitable interconnection architecture 212 that accommodates data communication, the transmission of control or command signals, and/or the delivery of operating power within the system 200. The system 200 also includes or cooperates with a display element 214. It should be understood that FIG. 2 is a simplified representation of the system 200 that will be used for purposes of explanation and ease of description, and that FIG. 2 is not intended to limit the application or scope of the subject matter in any way. In practice, the system 200 will include other devices and components for providing additional functions and features, as will be appreciated in the art. Furthermore, although FIG. 2 depicts the system 200 as a single unit, the individual elements and components of the system 200 could be implemented in a distributed manner using any number of physically distinct pieces of hardware or equipment.

The processor 202 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In certain embodiments, the processor 202 controls and manages the system 200 for purposes of generating and rendering appropriate display features in an appropriate manner.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. In practice, a functional or logical module/component of the system 200 might be realized using program code that is maintained in the memory 204. For example, the graphics system 208 or the status tracking application 210 may have associated software program components that are stored in the memory 204. Moreover, the memory 204 can be used to store data utilized to support the operation of the system 200, as will become apparent from the following description.

The illustrated embodiment of the system 200 includes a user interface 206, which is suitably configured to receive input from a user and, in response to the user input, supply appropriate command signals to the processor 202. The user interface 206 may be any one, or any combination, of various known user interface devices or technologies, including, but not limited to: a cursor control device such as a mouse, a trackball, or joystick; a keyboard; buttons; switches; or knobs. Moreover, the user interface 206 may cooperate with the display element 214 and the graphics system 208 to provide a graphical user interface. Thus, a user can manipulate the user interface 206 by moving a cursor symbol rendered on the display element 214, and the user may use a keyboard to, among other things, input textual data. For example, the user could manipulate the user interface 206 to update the status of tracked events, to set display preferences, to rotate or pivot the three-dimensional rendering of the arrangement of markers, to access detailed information regarding tracked events, or the like.

The status tracking application 210 may leverage existing technologies (e.g., database management applications, spreadsheet applications, inventory tracking applications, and the like) that enable a user to create and monitor tracked events. In this regard, the status tracking application 210 may provide status data that is used to generate the renderings of the three-dimensional markers in the manner described in more detail below. The status tracking application 210 may also enable a user to obtain detailed information and status data for tracked events, where such additional information might not be conveyed in the visual model rendered on the display element.

In an exemplary embodiment, the display element 214 is coupled to the graphics system 208, which is coupled to the processor 202 such that the processor 202 and the graphics system 208 cooperate to display, render, or otherwise convey one or more graphical representations, synthetic displays, graphical icons, visual symbology, or images on the display element 214, as described in greater detail below. An embodiment of the system 200 may utilize existing graphics processing techniques and technologies in conjunction with the graphics system 208. For example, the graphics system 208 may be suitably configured to support well known graphics technologies such as, without limitation, VGA, SVGA, UVGA, or the like.

In an exemplary embodiment, the display element 214 is realized as an electronic display configured to graphically and visual convey the status and progress of tracked processes, under control of the graphics system 208. In this regard, the display element 214 may be, for example, a light emitting diode (LED) display, a cathode ray tube (CRT) display, a heads-up display; a liquid crystal display (LCD); a flat panel display; a projector display; or the like. In practice, the processor 202 and/or the graphics system 208 produces image rendering display commands that are received by the display element 214 for purposes of rendering the desired images.

An embodiment of the tracking system could also utilize both a physical model and a virtual or computer-implemented model. For example, movement and/or position of physical markers could be detected, sensed, or otherwise recorded in real-time or substantially real-time for purposes of automated updating of the corresponding virtual model. This could be accomplished with an appropriate data communication link (preferably wireless) between a tangible board and a computer system, mobile computing device, or the like. In certain embodiments, a wireless sensing or tracking subsystem can be deployed in the vicinity of the tangible marker board for purposes of detecting when the markers are moved, added, or removed from the tangible marker board. In response to such detection, the sensing or tracking subsystem communicates updated status information to the computer-based virtual counterpart, which in turn updates its graphical representation of the marker board.

In one preferred implementation, radio frequency identification (RFID) tags are attached to or incorporated into the physical markers, and one or more RFID readers are deployed with appropriate location-determining technology that is capable of resolving the location of each RFID-enabled marker at any given time. As is well understood, each RFID tag (and, therefore, each marker) may have a unique identifier or digital string assigned thereto. These identifiers can be used to identify each marker and to correlate each marker with, for example, its virtual counterpart.

To determine the location of the markers, for example, a plurality of RFID readers can be used to locate a given marker using well known triangulation techniques. This approach can be implemented to determine the position of each physical marker relative to the axes used on the tangible board. Consequently, the position or location data for the markers can be provided to the computer-based virtual system for processing and graphical rendering of the virtual markers in accordance with their actual positions. In practice, such automated updating of the virtual representation is desirable because it reduces user workload and eliminates a source of data entry error.

For ease of understanding and conceptualization, an exemplary embodiment will now be described in the context of a tangible and physical model. It should be appreciated, however, that the concepts, features, and methodologies described herein for the physical model also apply to a virtual or computer-implemented embodiment. Those skilled in the art will understand how the characteristics and features of the physical model can be translated into the virtual domain for implementation as a computer-implemented graphical model. For example, the processor 202, the graphics system 208, and the status tracking application 210 of the system 200 (see FIG. 2) may be suitably configured and designed to cooperate in the intended manner to generate graphical representations of the tangible model, i.e., a virtual simulation using graphical elements rendered on the display element 214.

Figure 3:
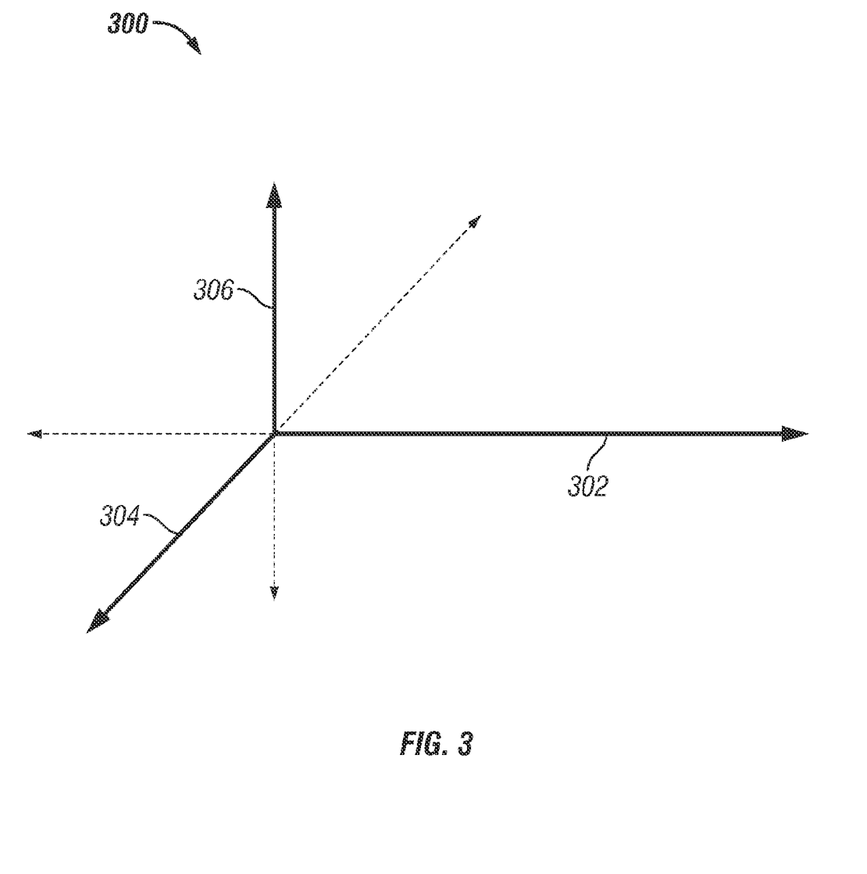
FIG. 3 is a diagram that illustrates an exemplary visually perceivable three-dimensional environment, field, or area suitable for use with the techniques and methods described herein.

FIG. 3 is a diagram that illustrates an exemplary visually perceivable three-dimensional environment 300, field, coordinate system, or area suitable for use with the techniques and methods described herein. The three-dimensional environment 300 can be used as the domain for the three-dimensional visualization techniques described herein. Although not always required, this particular version of the three-dimensional environment 300 includes and is defined by at least three axes: a temporal axis 302; a category axis 304; and a quantity axis 306. For ease of illustration and visualization, these axes are depicted in a mutually orthogonal arrangement, although orthogonality is not required. For simplicity, the following description assumes that only the "positive" directions of the three axes are used. In practice, however, negative values (represented by the dashed axis lines in FIG. 3) could be represented.

The temporal axis 302 can be used to indicate, without limitation: the passage of time; aging of trackable events; time periods, increments, or slots; a sequence of steps, stages, conditions, or states of a process; participation levels; levels or stages of requirements completion; etc. The temporal axis 302 may have one or more units associated therewith. For the exemplary embodiment described in more detail below, the temporal axis 302 indicates the age of trackable events in weekly increments. Alternatively (or additionally), the temporal axis 302 could indicate other time periods such as hours, days, months, years, etc. As another example, the temporal axis 302 could be used to designate certain stages associated with the treatment of a patient in a healthcare facility environment. In this context, the temporal axis 302 may indicate sequential steps in a typical patient throughput scenario, such as, without limitation: Sign-In; Registration; Waiting Room; Treatment Room(s); and Discharged. As yet another example, the temporal axis 302 could be used to designate the progression of a sales deal using common sequential descriptors such as, without limitation: Sales Pipeline; Contact; Negotiation; and Closed.

The category axis 304 can be used to indicate different event categories that might be associated with the trackable events. In this regard, the category axis 304 can accommodate any desired grouping, classification, categorization, or association of trackable events, such that events that share common characteristics, traits, or properties are depicted using markers that are aligned at a common position defined on the category axis 304. For the exemplary embodiment described herein, the category axis 304 indicates a number of functional engineering groups associated with an automobile. In this regard, the category axis 304 may indicate, without limitation, some or all of the following engineering groups: Body; Chassis; Electrical; Interior; Powertrain; Thermal; Assembly Facility; and Supplier. As another example, the category axis 304 could be used to indicate different types of patients in a healthcare facility implementation, such as, without limitation: Male; Female; Infant; Child; and Adult. It should be realized that the concept presented here could be expanded to track completion or participation level at any type of function including schools where categories such as Grade, Teacher, Club, or Sport could be tracked on the category axis 304.

The quantity axis 306 can be used to indicate the number of trackable events corresponding to a particular category and/or corresponding to a particular position on the temporal axis 302. For the exemplary embodiment described below, the quantity axis 306 indicates the number of trackable events that begin or occur during a designated period of time for a given category, i.e., one of the weeks identified along the temporal axis 302. As time progresses and the visual representation is updated, the quantity axis 306 indicates how many trackable events remain pending or open for a given category, along with the age of those events. Referring again to FIG. 1, the quantity axis 306 corresponds to the height of the markers 101 on the board. Accordingly, markers can be "stacked" along the quantity axis 306 to indicate increasing quantity.

Figure 4:
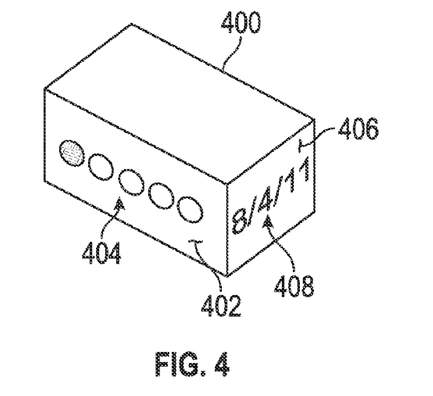
FIG. 4 is a perspective view showing first and second sides of an event marker.
Figure 5:
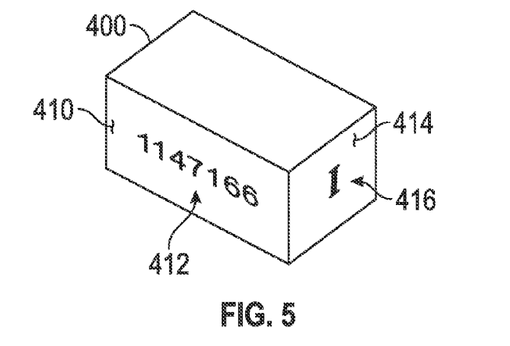
FIG. 5 is a perspective view showing third and fourth sides of the event marker shown in FIG. 4.

The methodology presented here employs markers that represent trackable events. These markers can be visualized in three dimensions within the predefined environment. The markers may be shaped and sized as desired for the specific application or embodiment. For the illustrated embodiment, the markers are realized or displayed as stackable three-dimensional rectangular building blocks. In this regard, FIG. 4 is a perspective view showing first and second sides of an event marker 400, and FIG. 5 is a perspective view showing third and fourth sides of the event marker 400.

One side 402 of the event marker 400 includes a progress identifier 404, which visually indicates a current progress status for the trackable event assigned to the event marker. The progress identifier 404 can be used to indicate the progression of the trackable event from an initial status to a final status, using an appropriate graphical scheme. This allows users to quickly obtain a general understanding of the event progress status by glancing at the event marker 400. Notably, the actual progress status as depicted by the progress identifier 404 need not be linked to or otherwise correlated with the passage of time or the units represented by the temporal axis 302 (see FIG. 3). In other words, the progression of the trackable event (as reflected by the progress identifier 404) may be an independently tracked parameter. In certain embodiments, the progress identifier 404 is realized as a series of circles (or any desired shape) that are added, colored, shaded, or filled in as the trackable event progresses from its initial (open) status to its final (closed) status. The number of circles may be consistent for all event markers, or the number of circles might vary depending upon the particular characteristics, traits, and/or properties of the trackable events.

In the context of tracking issues, tasks, or problems related to vehicle manufacturing or support, the progress identifier 404 can be used to indicate the current status of an open issue. For one exemplary embodiment, the first circle of the progress identifier 404 is added, filled in, or checked when the preliminary root cause of the issue has been identified. The second circle is added, filled in, or checked when the actual root cause has been identified. Identifying the preliminary root cause quickly narrows down the possibilities to, for example, a subgroup. In contrast, the root cause identifies the exact item or element at issue. For example, assume that a lawnmower won't start, and that the three requirements for engine operation are: fuel; spark; and compression. If normal amounts of fuel and compression are present, then one may conclude that the preliminary root cause relates to the ignition system. Referring again to the progress identifier 404, the third circle is added, filled in, or checked when a solution has been identified. The fourth circle is added, filled in, or checked when the solution has been implemented. The fifth circle is added, filled in, or checked when the solution has been verified (i.e., when the issue has been closed).

Another side 406 of the event marker 400 includes a date identifier 408 (and/or a time identifier). The date identifier 408 could be used to indicate the date when the event marker 400 was introduced into the visual environment, the date when the trackable event corresponding to the event marker 400 was initialized or opened, the date when a first progress milestone for the trackable event was completed, or the like. Indeed, the date identifier 408 could indicate any date, time, day, month, and/or week having some contextual significance relative to the trackable event. For the exemplary embodiment described here, the date identifier 408 indicates the open date for the issue being tracked. In this regard, the open date may also correspond to the date when the issue was input as an entry in a computer-implemented tracking application.

Another side 410 of the event marker 400 includes an event identifier 412 that uniquely identifies the trackable event linked to the event marker 400. The event identifier 412 may be, without limitation: a number; an alphanumeric expression; text; a bar code; one or more symbols; a radio frequency identification tag; or the like. The event identifier 412 is unique at least within the domain of the visual tracking system. Moreover, the event identifier 412 could be maintained by a computer-implemented application to enable users to access and view additional status data and information for the trackable event, by entering the event identifier 412 for purposes of data lookup. Thus, the visual model could be used to gain a high level and general understanding of the status of the trackable events, and the event identifiers rendered on or with the event markers can be used to gain access to detailed status data that might not be available in the visual model.

Another side 414 of the event marker 400 includes a category identifier 416 that identifies the event category (if any) for the event marker 400. The category identifier 416 may be, without limitation: a number; an alphanumeric expression; text; a bar code; one or more symbols; a radio frequency identification tag; or the like. For this exemplary embodiment, the category identifier 416 is an initial or abbreviation of the event category. Thus, the letter "B" corresponds to the Body category, the letter "C" corresponds to the Chassis category, the letter "E" corresponds to the Electrical category, the letter "I" corresponds to the Interior category, the letter "P" corresponds to the Powertrain category, and the letter "T" corresponds to the Thermal category.

In certain embodiments, the event markers are provided in a plurality of different colors that indicate the assigned event categories. A marker coloring scheme may be implemented with or without the category identifiers described in the previous paragraph. In practice, a different color or shade can be used to uniquely identify each event category. The use of different colors may be desirable in certain situations where markers from different categories are grouped or stacked together. Under such conditions, colored markers enable users to quickly distinguish the different categories from one another. A distinct color may also be used across categories to indicate special circumstances. For example, red markers or red trim or indicia on a colored marker could be used (regardless of category) to indicate trackable events having high priority, an impending deadline, critical importance, high value, or the like. Other special colors could be utilized as needed to indicate other characteristics of the trackable events.

Although not always required, the exemplary embodiment employs event markers having different sizes, where the size of a given event marker indicates a level of importance, a priority, a value, a ranking, or any distinguishable characteristic assigned to the trackable event. For example, smaller sized event markers might represent relatively low priority items, while larger sized event markers might represent relatively high priority items. Although any number of different marker sizes may be contemplated, for simplicity the exemplary embodiment uses small, medium, and large sized event markers corresponding to low, intermediate, and high priority events. The use of different sized markers adds yet another visually distinguishable cue to enable users to quickly interpret the overall status of trackable events at a glance.

Figure 6:
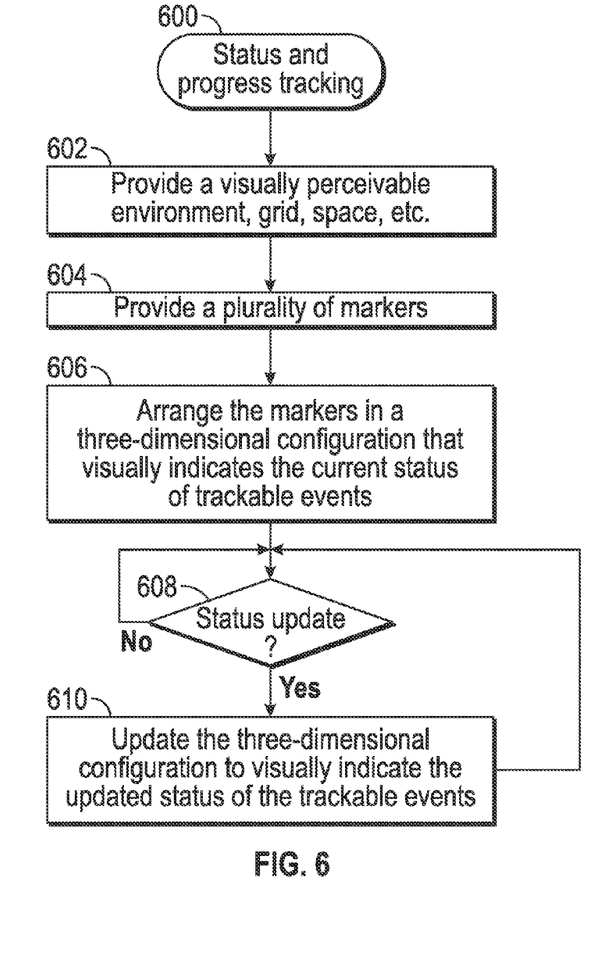
FIG. 6 is a flow chart that illustrates an exemplary embodiment of a status and progress tracking process.

A general workflow example will now be described with reference to FIG. 6, which is a flow chart that illustrates an exemplary embodiment of a status and progress tracking process 600. In certain embodiments, the various tasks performed in connection with the process 600 may be performed by software, hardware, firmware, or any combination thereof. For illustrative purposes, the following description of the process 600 may refer to elements mentioned above in connection with FIGS. 1-5. It should be appreciated that the process 600 may include any number of additional or alternative tasks, the tasks shown in FIG. 6 need not be performed in the illustrated order, and the process 600 may be incorporated into a more comprehensive procedure or process having additional functionality not described in detail herein. Moreover, one or more of the tasks shown in FIG. 6 could be omitted from an embodiment of the process 600 as long as the intended overall functionality remains intact.

The process 600 can be performed to provide a visually perceivable environment, grid, space, zone, area, or matrix to accommodate a three-dimensional arrangement of event markers (task 602). As mentioned above, this visually perceivable environment preferably has at least three axes corresponding to different characteristics of the trackable events. The process 600 also provides a plurality of markers that can be visualized in three dimensions (task 604), where each marker represents a respective trackable event. The markers are arranged in a three-dimensional configuration that visually indicates the current status of the trackable events that correspond to those markers (task 606). In practice, the three-dimensional configuration is provided in or is rendered in the visually perceivable environment such that users can easily view the configuration.

Referring again to FIG. 3, the markers may be arranged in accordance with the domains associated with the axes used in the visually perceivable environment. For this particular example, the markers are arranged along the category axis 304 in accordance with their respective event categories, along the temporal axis in accordance with the age of their respective trackable events, and along the quantity axis in accordance with a number of trackable events having temporal characteristics identified on the temporal axis. Thus, the three-dimensional configuration of markers visually indicates the quantity, temporal, and category characteristics of the trackable events. Moreover, the process could indicate progress identifiers 404 (see FIG. 4) on the markers to visually indicate progress status characteristics of the trackable events.

Over time, one or more characteristics, traits, or properties of the trackable events may change. Such changes may (but need not) warrant an update to the visual configuration (query task 608). This example assumes that the three-dimensional configuration is indeed updated (task 610). In this regard, the configuration of the markers is updated as needed to visually indicate the updated status of the trackable events. In a computer-implemented embodiment, task 610 may obtain data or information that is indicative of the updated status of the trackable events and, in response to that information, update the virtual representation of the configuration as needed. For this particular example, the updated configuration will visually indicate one or more changes in the quantity, temporal, category, and/or progress status characteristics of the trackable events.

Figure 7:
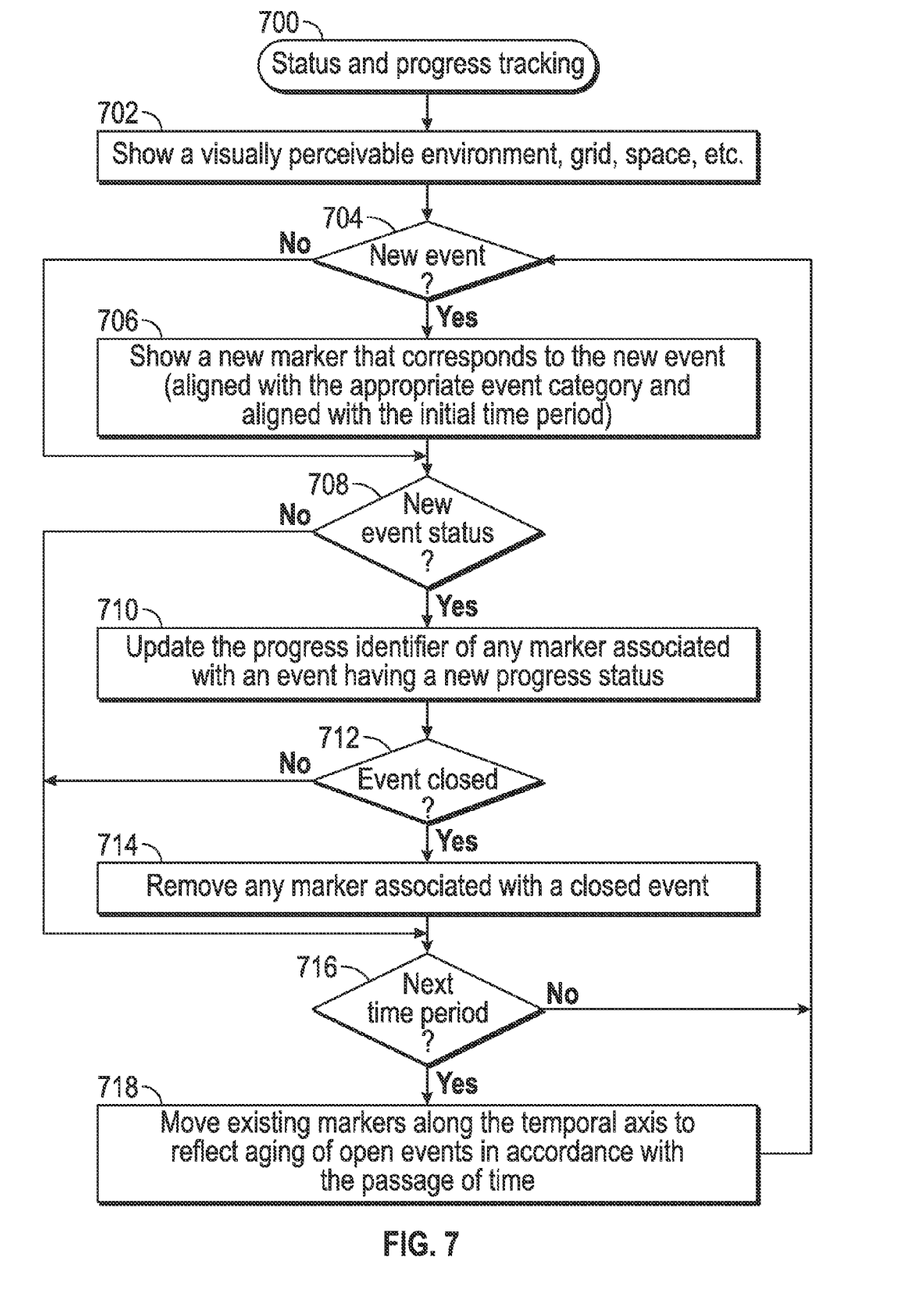
FIG. 7 is a flow chart that illustrates another exemplary embodiment of a status and progress tracking process.

As described in more detail below with reference to FIG. 7, task 610 may be repeated over time to reflect ongoing changes to the current status of the trackable events. Moreover, the manner in which the event markers are updated, moved, and otherwise shown may follow any set of rules, which may be specific to the particular application.

A more specific workflow example will now be described with reference to FIG. 7, which is a flow chart that illustrates another exemplary embodiment of a status and progress tracking process 700. In certain embodiments, the various tasks performed in connection with the process 700 may be performed by software, hardware, firmware, or any combination thereof. For illustrative purposes, the following description of the process 700 may refer to elements mentioned above in connection with FIGS. 1-5. It should be appreciated that the process 700 may include any number of additional or alternative tasks, the tasks shown in FIG. 7 need not be performed in the illustrated order, and the process 700 may be incorporated into a more comprehensive procedure or process having additional functionality not described in detail herein. Moreover, one or more of the tasks shown in FIG. 7 could be omitted from an embodiment of the process 700 as long as the intended overall functionality remains intact.

Figure 8:
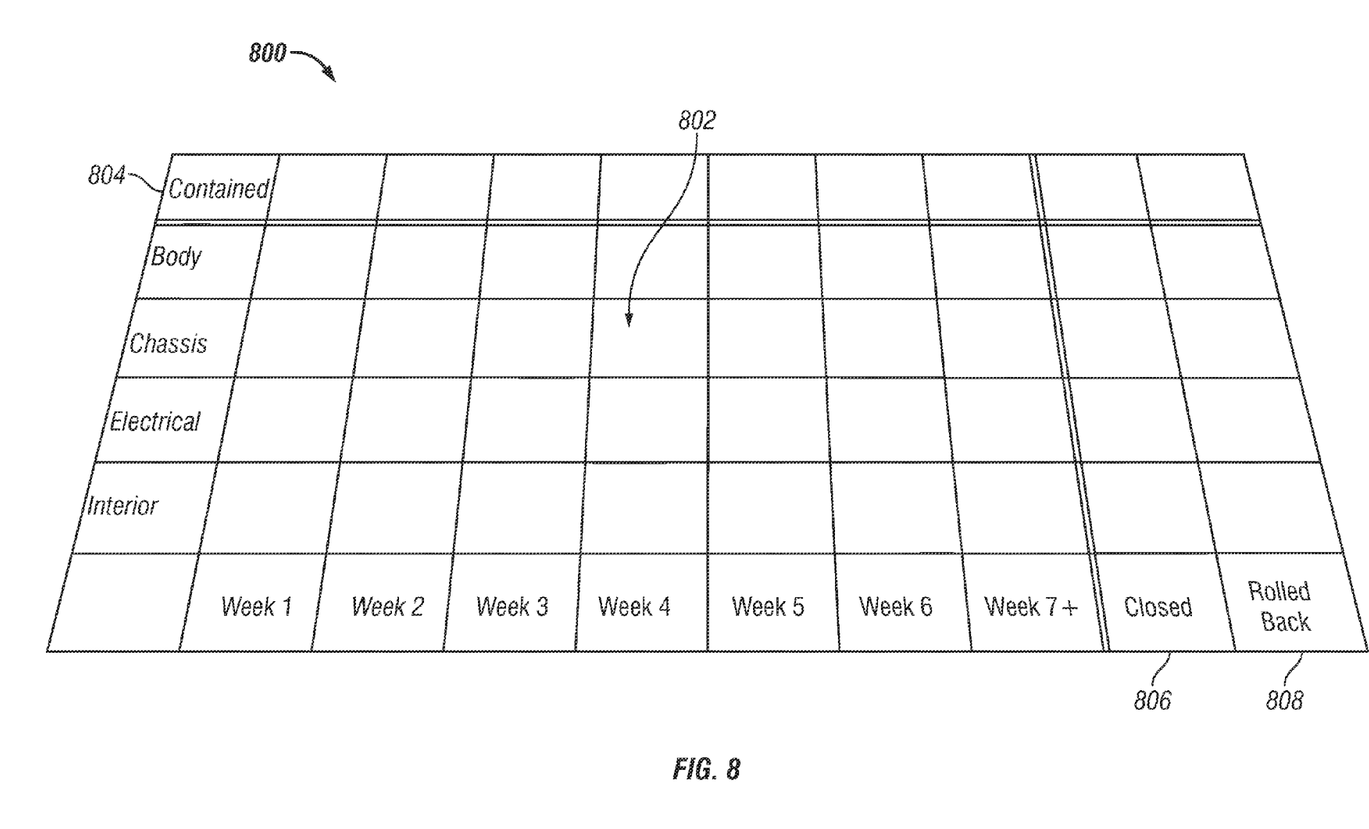
FIGS. 8-12 are diagrams that illustrate an exemplary use case for the three-dimensional visualization approach presented herein.

The exemplary process 700 shown in FIG. 7 will be described with reference to FIGS. 8-12, which correspond to one particular application in an automotive industry context. It should be realized that the process 700 is presented here as merely one possible example of how the three-dimensional visual tracking approach could be used. The following description of this specific example is not intended to limit or otherwise restrict the scope or application of the subject matter in any way. FIG. 8 is a diagram that illustrates exemplary event categories and time periods for tracking and monitoring status and progress of events associated with the manufacturing, design, and/or testing of vehicles, and FIGS. 9-12 are diagrams that illustrate an exemplary use case for the three-dimensional visualization approach presented herein.

The process 700 may begin by showing, providing, or displaying a visually perceivable environment, grid, space, zone, or area (task 702), as described previously. FIG. 8 depicts an exemplary environment 800 for accommodating visually perceivable event markers in a three-dimensional manner. FIG. 8 depicts the environment 800 by itself without any markers. This particular environment 800 includes a main area 802 that is utilized to track the status of events over time. The main area 802 is generally defined by four rows corresponding to four categories (Body, Chassis, Electrical, and Interior) and by seven columns corresponding to seven weekly time periods (Week 1, Week 2, Week 3, Week 4, Week 5, Week 6, and Week 7+). It should be appreciated that, in practice, more or less than four categories, and more or less than seven weeks could be employed. The environment 800 can be used to track issues related to the various engineering categories listed on the rows. The Week 1 column represents the current week, which may be a calendar week (Sunday through Saturday), a work week (Monday through Friday), or any portion of a calendar week. The Week 2 column is used to identify events that were added to the environment 800 during the previous week. Likewise, the other weekly columns are used to identify the age of older events that were added to the environment 800 in the past. The Week 7+ column is used to identify events that are seven or more weeks old.

The illustrated environment 800 also includes a non-category row labeled "Contained"—unlike each of the four category rows, markers associated with different categories may appear in the Contained row 804. The Contained row 804 is used to indicate issues that have been contained (i.e., a workaround or temporary solution has been identified) but are not yet fully resolved or closed. The illustrated environment 800 also includes a column labeled "Closed"—the Closed column 806 is used to identify issues that have been fully resolved or closed. Markers are collected in the Closed column 806 as they are closed, and closed markers can remain in the Closed column 806 for any desired period of time. For this particular embodiment, closed markers are gathered in the Closed column 806 during each current week, and are removed from the Closed column 806 at the beginning of each new week. The environment 800 may also include a "Rolled Back" column 808 that is used to identify previously closed issues that have been reopened or reinstated. Markers are placed in the Rolled Back column 808 when issues are reopened, and those markers remain in the Rolled Back column 808 until they are closed again.

Figure 9:
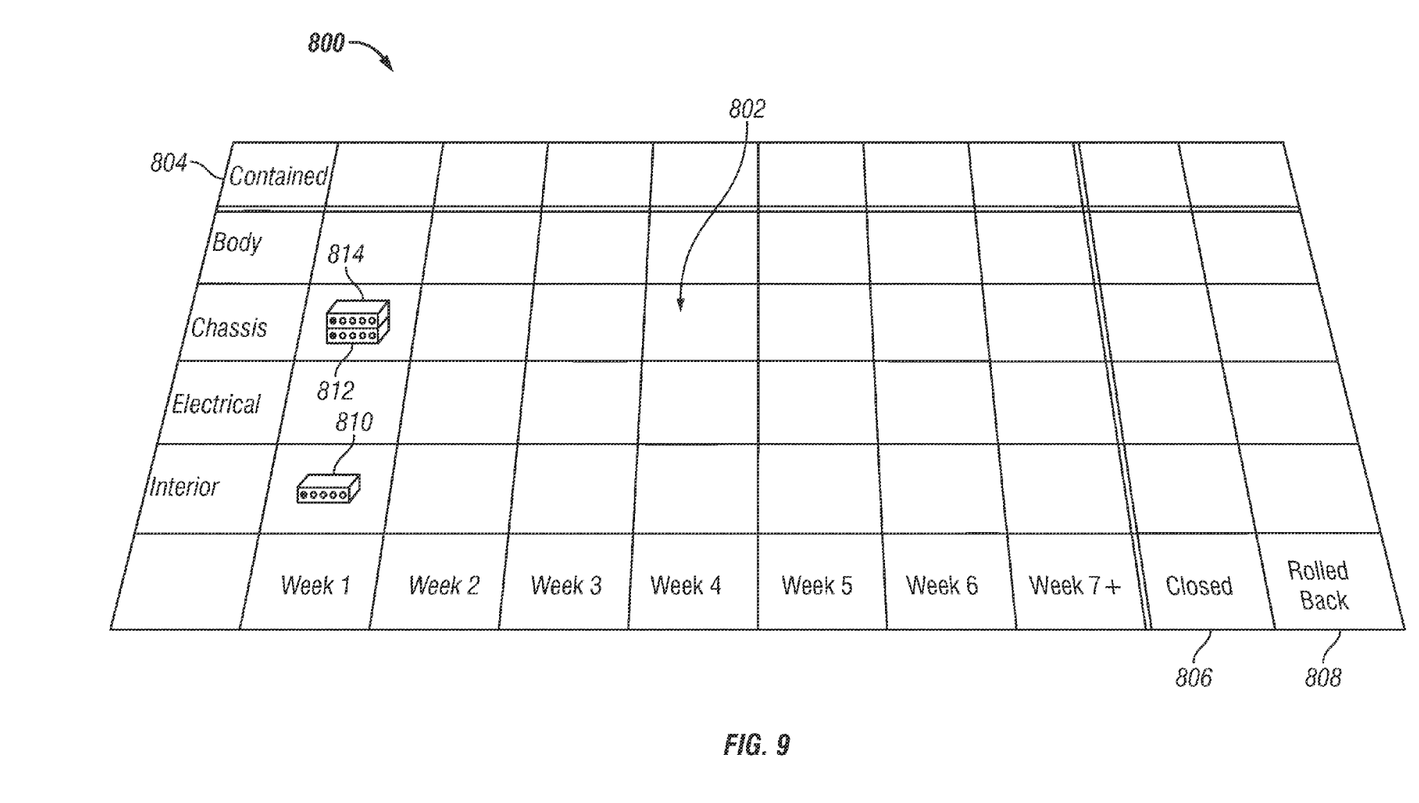

Referring again to FIG. 7, if a new event or issue is opened (query task 704), then the process 700 shows a new marker in the three-dimensional environment, where the new marker corresponds to the new event. For this particular example, the new marker will appear aligned with the appropriate event category, and aligned with the initial time period or week. FIG. 9 depicts the state of the environment 800 after three markers have been added to the Week 1 column. One marker 810 appears in the Interior row, and two markers 812, 814 appear in the Chassis row. Notably, the two markers 812, 814 are stacked in the direction corresponding to the quantity axis of the environment 800. The progress identifiers for all three of these markers 810, 812, 814 have been set to indicate at least a minimal amount of progress. For this example, at least the first circle of the progress identifier is filled in when a new marker appears in the environment 800.

After the new marker is shown (or if a new event has not been opened), the process 700 checks whether the progress status of any existing event has changed (query task 708) during the course of the current week. If the status of all events remains unchanged, then the process leads to a query task 716, which is described in more detail below. If, however, there is a new status to consider, then the process 700 updates the progress identifier of any marker associated with an event having a new progress status (task 710). For example, if the event corresponding to the marker 814 progresses during the current week, then at least the second circle of the progress identifier will be filled in, while the marker 814 remains in its position at the intersection of the Chassis row and the Week 1 column. In this regard, the progress of an event as indicated on a marker may remain unchanged for an entire week (or longer), or it may change by any amount, depending upon the actual workflow and progression towards resolution.

After updating the progress identifiers, the process 700 may check whether any events are now closed (query task 712). If there are no closed events, then the process 700 leads to the query task 716, which is described in more detail below. If, however, one or more events have been closed, then the corresponding markers are removed from the environment (task 714). In other words, markers that represent events that no longer require tracking are removed from the visually perceivable three-dimensional configuration. In accordance with this example, markers for closed events are moved from the main area 802 to the Closed column 806 (aligned with their respective category rows as applicable), where they may remain for the duration of the current week.

As mentioned above, this example arranges the markers using weeks as designated time periods. Moreover, the three-dimensional visual representation is updated on a weekly basis to reflect aging of the open events. Accordingly, the process 700 checks whether the next time period (week) has begun (query task 716). If not, then the process 700 may be re-entered at task 704 to proceed as described above to add new markers, update the progress identifiers on active markers, and remove markers for closed events. At the beginning of a new time period, however, the environment 800 is updated to reflect the passage of time. In this regard, the environment 800 is updated by moving existing markers from their previous positions (defined by the temporal axis) to new positions (task 718). For this particular embodiment, markers previously positioned in the Week 1 column are moved to the Week 2 column, markers previously positioned in the Week 2 column are moved to the Week 3 column, and so on. In other words, the markers are "shifted" by one week to reflect aging in accordance with the passage of time. Immediately after this updating, therefore, the Week 1 column will be empty. Notably, any active markers positioned in the Week 7+ column remain in place, and are joined by the markers previously positioned in the Week 6 column.

Figure 10:
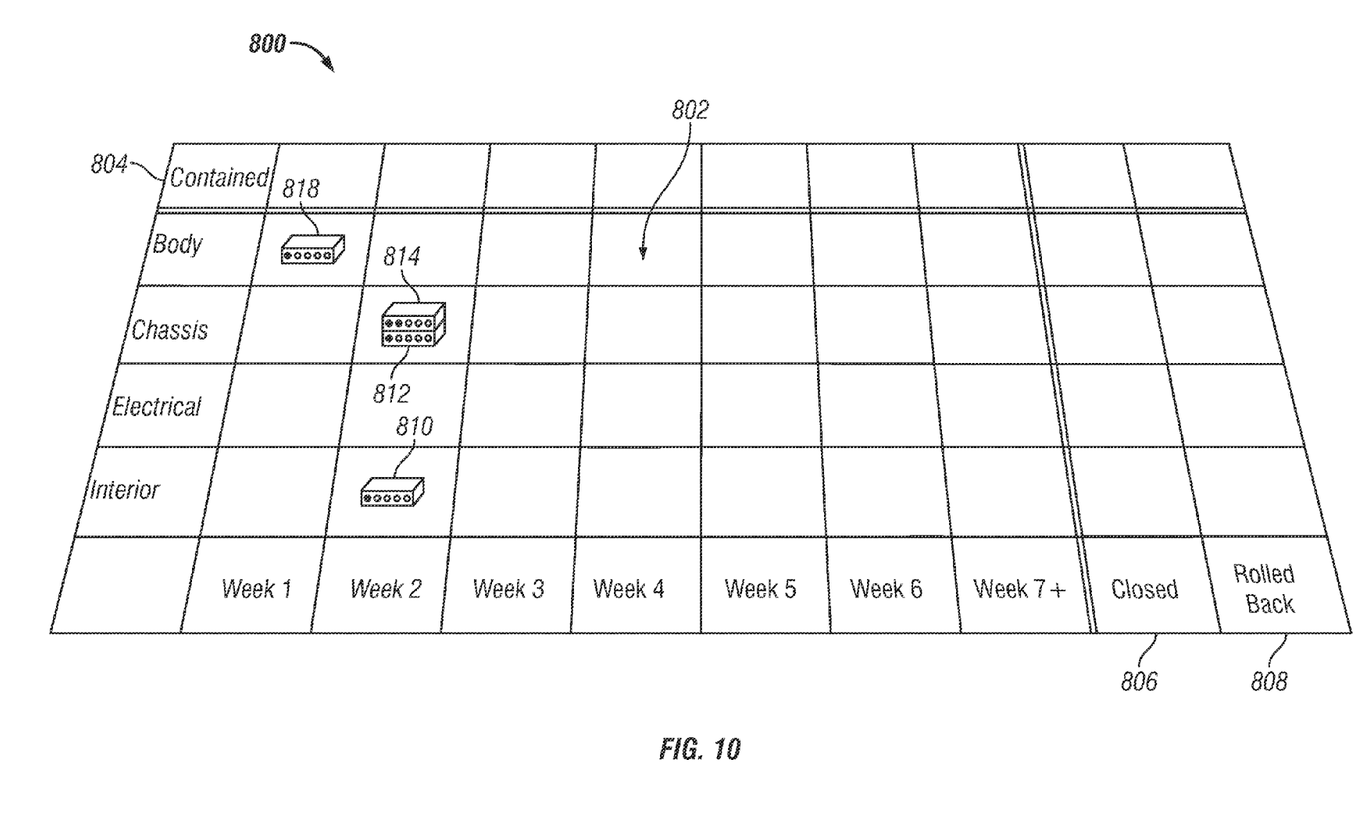

FIG. 10 depicts the state of the environment 800 after updating to reflect the beginning of a new week. Accordingly, the markers 810, 812, 814 now appear in the Week 2 column rather than the Week 1 column. In addition, the progress identifier on the marker 814 has been updated to reflect a new progress status for that trackable event. FIG. 10 also depicts a newly added marker 818 in the Week 1 column; this marker 818 corresponds to an issue opened for the Body category.

Figure 11:
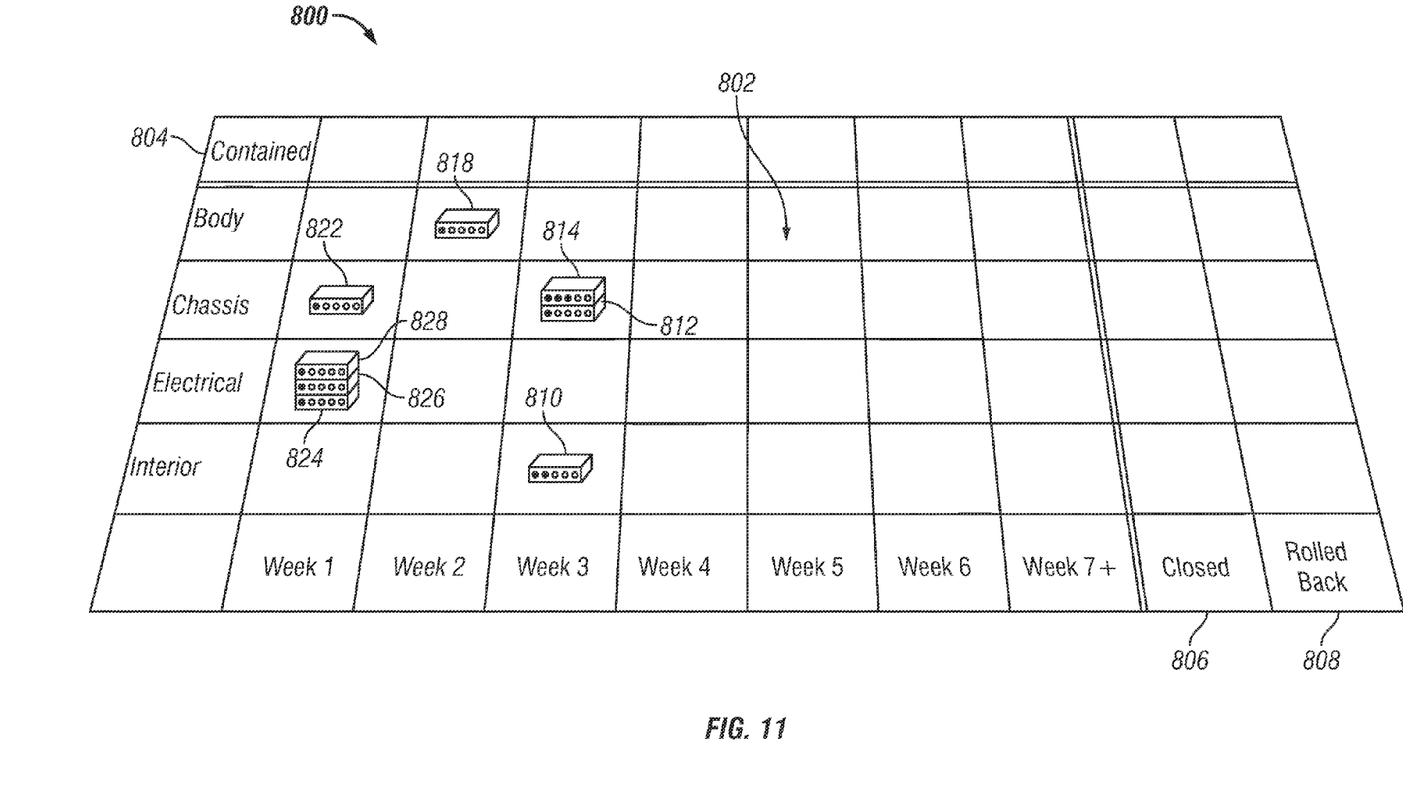

FIG. 11 depicts the state of the environment 800 after yet another weekly update. Accordingly, the markers 810, 812, 814 now appear in the Week 3 rather than the Week 2 column, and the marker 818 now appears in the Week 2 column rather than the Week 1 column. The progress identifiers on the markers 810, 814 have also been changed. The environment 800 now contains four additional markers in the Week 1 column: one marker 822 in the Chassis row; and three markers 824, 826, 828 in the Electrical row.

Figure 12:
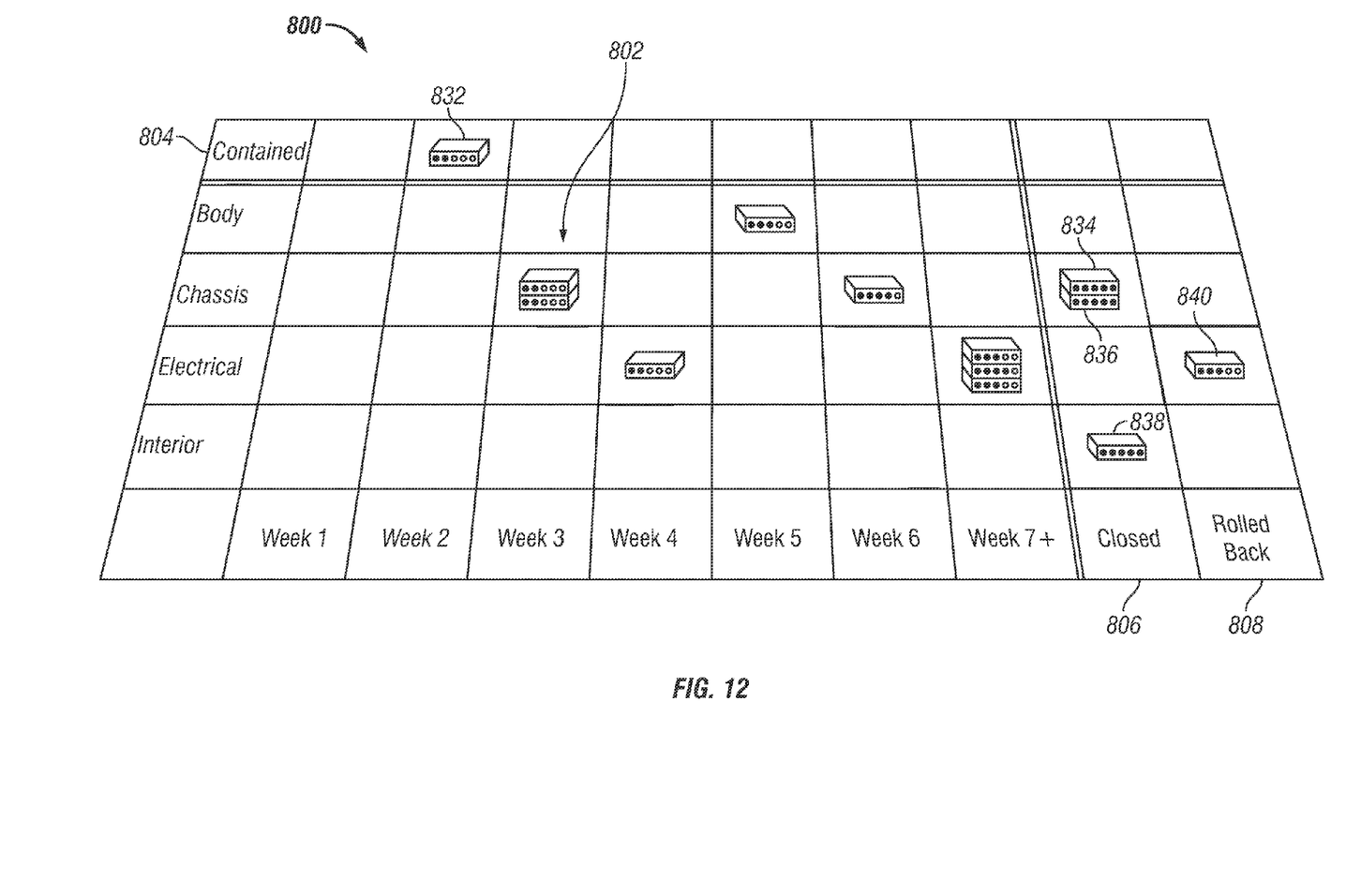

FIG. 12 depicts the state of the environment 800 after it has been used for at least seven weeks to track the status of various trackable events. At this time, a marker 832 in the Contained row 804 represents an issue or problem that has been changed to "contained" status. FIG. 12 also depicts a scenario where three events have been closed at some point during the current week: two events in the Chassis category, which are represented by two markers 834, 836; and one event in the Interior category, which is represented by a marker 838. FIG. 12 also depicts one marker 840 in the Rolled Back column 808. This marker 840 represents a previously closed issue (in the Electrical category) that has been reopened for further investigation.

FIGS. 8-12 illustrate how the environment 800 accommodates the three-dimensional visual representation of process status, event progression, and volume of events at any given time. The visualization technique presented here enables users to easily determine an overall status by quickly glancing at a three-dimensional model or rendering that contains markers corresponding to active and closed events.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of tracking status and progress of a process, the method comprising the steps of:

providing a plurality of different sized and different colored tangible and physically stackable markers that can be visualized in three dimensions, each of the plurality of tangible and physically stackable markers representing a respective trackable event, and each of the plurality of tangible and physically stackable markers having a height, a first side, a second side, a third side, and a fourth side, wherein the size of a tangible and physically stackable marker indicates a level of importance assigned to the corresponding trackable event, and wherein the color of a tangible and physically stackable marker indicates a category assigned to the corresponding trackable event;

arranging the plurality of tangible and physically stackable markers in a three-dimensional configuration that visually indicates current status of a plurality of trackable events corresponding to the plurality of tangible and physically stackable markers;

indicating a respective progress identifier on the first side of each of the plurality of tangible and physically stackable markers, wherein a progress identifier indicates a current progress status for a trackable event assigned to a tangible and physically stackable marker;

indicating a respective event identifier on the second side of each of the plurality of tangible and physically stackable markers, wherein an event identifier uniquely identifies a trackable event;

indicating a respective date identifier on the third side of each of the plurality of tangible and physically stackable markers, wherein a date identifier indicates a contextually significant date for a trackable event;

indicating a respective category identifier on the fourth side of each of the plurality of tangible and physically stackable markers, wherein a category identifier identifies the category assigned to a trackable event and updating the three-dimensional configuration over time to visually indicate an updated status of the plurality of trackable events.

2. The method of claim 1, further comprising the step of accessing status data and information for a trackable event, using its respective event identifier.

3. The method of claim 1, wherein:
the three-dimensional configuration includes a category axis associated with a plurality of different event categories; and
the arranging step arranges the plurality of tangible and physically stackable markers along the category axis in accordance with their respective event categories.

4. The method of claim 1, wherein:
the three-dimensional configuration includes a temporal axis; and
the arranging step arranges the plurality of tangible and physically stackable markers along the temporal axis in accordance with age of their respective trackable events.

5. The method of claim 4, wherein the step of updating comprises moving at least one of the plurality of tangible and physically stackable markers from a first position defined by the temporal axis to a second position defined by the temporal axis in accordance with a passage of time.

6. The method of claim 4, wherein:
the three-dimensional configuration includes a quantity axis; and
the arranging step arranges the plurality of tangible and physically stackable markers along the quantity axis in accordance with a number of trackable events having temporal characteristics identified on the temporal axis.

7. The method of claim 1, further comprising the step of removing from the three-dimensional configuration any of the plurality of tangible and physically stackable markers that represent trackable events that no longer require tracking.

8. A computer-implemented method of tracking a process having quantity, temporal, and progress status characteristics, the method comprising the steps of:
rendering, on a display element, a plurality of different sized and different colored stackable markers in a three-dimensional configuration that visually indicates the quantity, temporal, and progress status characteristics of a plurality of trackable events, each of the plurality of stackable markers representing a respective one of the plurality of trackable events, and each of the stackable markers having a height, a first side, a second side, a third side, and a fourth side, wherein the size of a stackable marker indicates a level of importance assigned to the corresponding trackable event, and wherein the color of a stackable marker indicates a category assigned to the corresponding trackable event;
obtaining information indicative of an updated status of the plurality of trackable events;
indicating a respective progress identifier on the first side of each of the plurality of stackable markers, wherein a progress identifier indicates a current progress status for a trackable event assigned to a stackable marker;
indicating a respective event identifier on the second side of each of the plurality of stackable markers, wherein an event identifier uniquely identifies a trackable event;
indicating a respective date identifier on the third side of each of the plurality of stackable markers, wherein a date identifier indicates a contextually significant date for a trackable event;
indicating a respective category identifier on the fourth side of each of the plurality of stackable markers, wherein a category identifier identifies the category assigned to a trackable event; and
in response to obtaining the information, updating the three-dimensional configuration to visually indicate the updated status of the plurality of trackable events.

9. The computer-implemented method of claim 8, wherein the updated status of the plurality of trackable events is indicative of a change in the quantity, temporal, or progress status characteristics of the plurality of trackable events.

10. The computer-implemented method of claim 8, wherein the three-dimensional configuration includes:
a quantity axis corresponding to quantity characteristics of the plurality of trackable events;
a temporal axis corresponding to ages of the plurality of trackable events; and
a category axis corresponding to a plurality of different event categories for the plurality of trackable events.

11. A method of tracking status and progress of a process, the method comprising the steps of:
providing a plurality of different sized and different colored tangible and physically stackable markers that can be visualized in three dimensions, each of the plurality of tangible and physically stackable markers representing a respective trackable event, and each of the plurality of tangible and physically stackable markers having a height, a first side, a second side, a third side, and a fourth side, wherein the size of a tangible and physically stackable marker indicates a level of importance assigned to the corresponding trackable event, and wherein the color of a tangible and physically stackable marker indicates a category assigned to the corresponding trackable event;
providing a visually perceivable tangible marker board having at least a category axis associated with a plurality of different event categories, a temporal axis, and a quantity axis defined therein;
indicating a respective progress identifier on the first side of each of the plurality of tangible and physically stackable markers, wherein a progress identifier indicates a current progress status for a trackable event assigned to a marker;
indicating a respective event identifier on the second side of each of the plurality of tangible and physically stackable markers, wherein an event identifier uniquely identifies a trackable event;
indicating a respective date identifier on the third side of each of the plurality of tangible and physically stackable markers, wherein a date identifier indicates a contextually significant date for a trackable event;
indicating a respective category identifier on the fourth side of each of the plurality of tangible and physically stackable markers, wherein a category identifier identifies the category assigned to a trackable event and
arranging the plurality of tangible and physically stackable markers on the marker board using a three-dimensional configuration that visually indicates current status of a plurality of trackable events corresponding to the plurality of tangible and physically tangible markers;

wherein:

the arranging step arranges the plurality of tangible and physically stackable markers along the category axis in accordance with respective event categories for the markers;

the arranging step arranges the plurality of tangible and physically stackable markers along the temporal axis in accordance with ages of respective trackable events corresponding to the markers; and the arranging step arranges the plurality of tangible and physically stackable markers along the quantity axis in accordance with a number of trackable events having temporal characteristics identified on the temporal axis.

* * * * *